(12) United States Patent
Wang et al.

(10) Patent No.: US 8,808,486 B2
(45) Date of Patent: Aug. 19, 2014

(54) METHOD FOR MANUFACTURING COLOR ELECTROPHORETIC DISPLAY DEVICE

(75) Inventors: Yi-Ching Wang, Hsinchu (TW);
Po-Wen Hsiao, Hsinchu (TW);
Kai-Cheng Chuang, Hsinchu (TW);
Yao-Chou Tsai, Hsinchu (TW);
Ted-Hong Shinn, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 160 days.

(21) Appl. No.: 12/905,691

(22) Filed: Oct. 15, 2010

(65) Prior Publication Data

US 2011/0290414 A1  Dec. 1, 2011

(30) Foreign Application Priority Data

Jun. 1, 2010  (TW) ............................. 99117659 A

(51) Int. Cl.
*B29C 65/48* (2006.01)
*B32B 37/14* (2006.01)
*B32B 38/14* (2006.01)
*G02F 1/167* (2006.01)
*B32B 37/26* (2006.01)

(52) U.S. Cl.
USPC ......... 156/235; 156/230; 156/247; 156/272.8

(58) Field of Classification Search
CPC ... G02F 1/167; G02F 1/0147; G02F 1/13306;
G02F 1/133305; G02F 1/1336; G02F 1/1334;
G02F 1/133514; G02F 1/13725; G02F 1/19;
G02F 1/21; G02F 2201/52; G02F 2202/12;
G02F 2202/28; G03G 17/04; G03G 9/12;
G03G 9/135; B41M 5/025; B41M 5/0356;
B41M 5/382; B41M 5/345; B41M 5/385;
B41M 5/40; G01N 30/95; G01N 30/74;
G01N 2021/177; G01N 2021/5919; G01N 21/5911; G01N 27/44721; G01N 30/90
USPC .............................. 156/230, 235, 247, 272.8
See application file for complete search history.

(56) References Cited

U.S. PATENT DOCUMENTS

| 5,858,624 A * | 1/1999 | Chou et al. ..................... 430/321 |
| 6,982,178 B2 * | 1/2006 | LeCain et al. ................... 438/22 |
| 7,075,703 B2 * | 7/2006 | O'Neil et al. .................. 359/296 |

(Continued)

FOREIGN PATENT DOCUMENTS

| CN | 1405630 A | 3/2003 |
| CN | 1898996 A | 1/2007 |

(Continued)

OTHER PUBLICATIONS

Taiwanese Patent Office issued Office Action Jan. 29, 2013.
State Intellectual Property Office of the People'S Republic of China, "Office Action", Aug. 30, 2013, China.

*Primary Examiner* — Sonya Mazumdar
(74) *Attorney, Agent, or Firm* — WPAT, PC; Justin King

(57) ABSTRACT

A method for manufacturing a color electrophoretic display device includes the following steps. First, a substrate having a displaying region and a circuit region around the displaying region is provided. Next, a driving array is formed in the displaying region. Subsequently, an electrophoretic display layer is formed on the driving array. Afterwards, a thermal transfer process is performed so that a color filter layer is formed on the electrophoretic display layer. The method can increase the production eligibility rate of the color electrophoretic display device, thereby improving the display quality of the color electrophoretic display device.

7 Claims, 10 Drawing Sheets

(56) References Cited

U.S. PATENT DOCUMENTS

| | | | |
|---|---|---|---|
| 7,554,712 B2* | 6/2009 | Patry et al. | 359/254 |
| 7,601,236 B2* | 10/2009 | Yamashita et al. | 156/230 |
| 7,887,663 B2* | 2/2011 | Matsuoka et al. | 156/240 |
| 8,482,712 B2* | 7/2013 | Shinn et al. | 349/158 |
| 2003/0214695 A1* | 11/2003 | Abramson et al. | 359/265 |
| 2004/0155857 A1* | 8/2004 | Duthaler et al. | 345/107 |
| 2008/0305287 A1* | 12/2008 | Ohata et al. | 428/32.39 |
| 2009/0004442 A1* | 1/2009 | Danner | 428/195.1 |
| 2009/0296248 A1* | 12/2009 | Gotoh | 359/891 |

FOREIGN PATENT DOCUMENTS

| | | |
|---|---|---|
| CN | 101093350 A | 12/2007 |
| CN | 101221338 | 7/2008 |
| CN | 101290364 A | 10/2008 |
| CN | 101806983 A | 8/2010 |
| JP | 2007-506136 A | 3/2007 |
| TW | 200728781 A | 8/2007 |
| TW | 200933277 | 8/2009 |
| TW | 201007651 | 2/2010 |

* cited by examiner

METHOD FOR MANUFACTURING COLOR ELECTROPHORETIC DISPLAY DEVICE

BACKGROUND

1. Technical Field

The present invention relates to a method for manufacturing a display device, and particularly to a method for manufacturing a color electrophoretic display device.

2. Description of the Related Art

Traditional electrophoretic display devices are black and white display devices. In order to make the electrophoretic display devices stand more competitively in the marketplace, the color filter is generally used to achieve a colorful effect of the traditional electrophoretic display devices. Thus, the electrophoretic display devices can satisfy the colorful trend of the current display devices.

Currently, a traditional color filter applied in a color electrophoretic display device generally includes a glass substrate and a number of color filter patterns disposed on the glass substrate. The traditional color filter is adhered to an electrophoretic display layer of the electrophoretic display device to achieve the colorful effect of the electrophoretic display device. However, the electrophoretic display layer is also generally disposed on the glass substrate. When the traditional color filter is adhered to the electrophoretic display layer, a number of air bubbles are generated between the traditional color filter and the electrophoretic display layer. As a result, the color filter and the electrophoretic display layer can not be adhered together flatly. Thus, the production eligibility rate of the electrophoretic display device will be reduced, and further the display quality of the electrophoretic display device will be affected.

Additionally, for carrying the electrophoretic display device easily, the flexible electrophoretic display device is developed. However, the traditional color filter including the glass substrate can not be applied to the flexible electrophoretic display device to achieve the color effect. Recently, a flexible color filter suitable for the flexible electrophoretic display device is being researched. For example, the flexible color filter is manufactured with a color photoresist in a low temperature process and a transparent flexible substrate having a characteristic of anti-high temperature. However, when such flexible color filter is adhered to the electrophoretic display layer, the alignment of such flexible color filter and the electrophoretic display layer is difficult due to the flexibility of the transparent flexible substrate. Moreover, the thermal expansion property of the transparent flexible substrate will cause the inexact alignment of such flexible color filter and the electrophoretic display layer, thereby reducing the production eligibility rate of the flexible electrophoretic display device, and further affecting the display quality of the flexible electrophoretic display device.

BRIEF SUMMARY

The present invention is directed to a method for manufacturing a color electrophoretic display device so as to increase the production eligibility rate of the color electrophoretic display device and improve the display quality of the color electrophoretic display device.

The present invention provides a method for manufacturing a color electrophoretic display device. First, a substrate having a displaying region and a peripheral circuit region around the displaying region is provided. Next, a driving array is formed in the displaying region of the substrate. Next, an electrophoretic display layer is disposed on the driving array. Next, a thermal transfer process is performed so that a color filter layer is formed on the electrophoretic display layer.

In one embodiment of the present invention, the method for manufacturing the color electrophoretic display device further includes a step of forming a transparent protecting layer to cover the color filter layer and disposing a driving circuit in the peripheral circuit region of the substrate to electrically connect to the driving array.

In one embodiment of the present invention, the method for manufacturing the color electrophoretic display device further includes a step of forming an edge sealant between the transparent protecting layer and the substrate to surround the driving array and the electrophoretic display layer.

In one embodiment of the present invention, the method for manufacturing the color electrophoretic display device further includes a step of forming a packaging sealant in the peripheral circuit region of the substrate to cover the driving circuit.

In one embodiment of the present invention, the substrate includes a rigid substrate.

In one embodiment of the present invention, a method of providing the substrate includes the following steps. At first, a rigid substrate is provided. Then, a flexible substrate is formed on the rigid substrate. The flexible substrate includes a front surface and a rear surface. The rear surface is attached to the rigid substrate, and the driving array is formed on the front surface.

In one embodiment of the present invention, the method for manufacturing the color electrophoretic display device further includes the following steps. First, a transparent protecting layer is formed to cover the color filter layer. Next, a driving circuit is disposed on the substrate to electrically connect to the driving array. Next, the rigid substrate is removed.

In one embodiment of the present invention, a method of removing the rigid substrate may be a thermal separating method, a direct separating method and a laser separating method.

In one embodiment of the present invention, after the rigid substrate is removed, the method for manufacturing the color electrophoretic display device further includes a step of forming a backside protecting layer on the rear surface of the flexible substrate.

In one embodiment of the present invention, the thermal transfer process is a laser thermal transfer process. The laser thermal transfer process includes the following steps. First, a dye film is provided, which includes a base film and a dye layer disposed on the base film. Next, the dye film is disposed above the electrophoretic display layer so that the dye layer faces to the electrophoretic display layer. Next, a laser is applied to heat a number of predetermined areas of the dye film so that the dye layer in the predetermined areas is evaporated to transfer to the electrophoretic display layer.

In the method of the present invention, the color filter layer is directly formed on the electrophoretic display layer of the electrophoretic display device by using the thermal transfer process. Thus, the problems such as the air bubbles and the interspaces during adhering the traditional color filter without flexibility to the electrophoretic display layer disposed on the glass substrate can be avoided. Meanwhile, the problems such as the difficult alignment and the inexact alignment during adhering the flexible color filter to the electrophoretic display layer disposed on the glass substrate can be avoided. Therefore, the method for manufacturing the color electrophoretic display device can increase the production eligibility rate of the color electrophoretic display device and improve the display quality of the color electrophoretic display device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

FIG. 1A to FIG. 1M illustrate schematic, partial, cross-sectional views of a color electrophoretic display device during a process flow in accordance with a first embodiment of the present invention. In the present embodiment, a method for manufacturing a color electrophoretic display device includes the following steps.

Figure 1A:
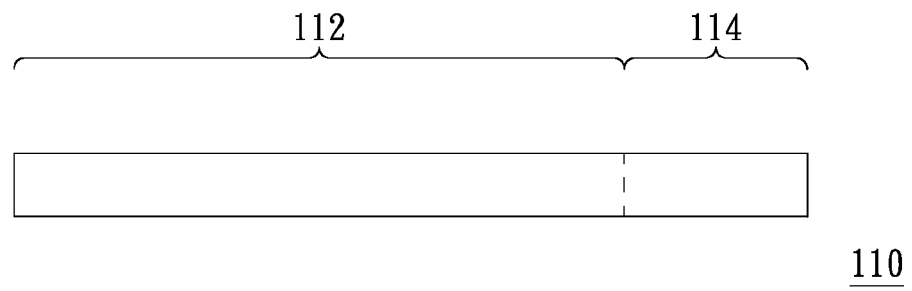
FIG. 1A to FIG. 1M illustrate schematic, partial, cross-sectional views of a color electrophoretic display device during a process flow in accordance with a first embodiment of the present invention.
Figure 2:
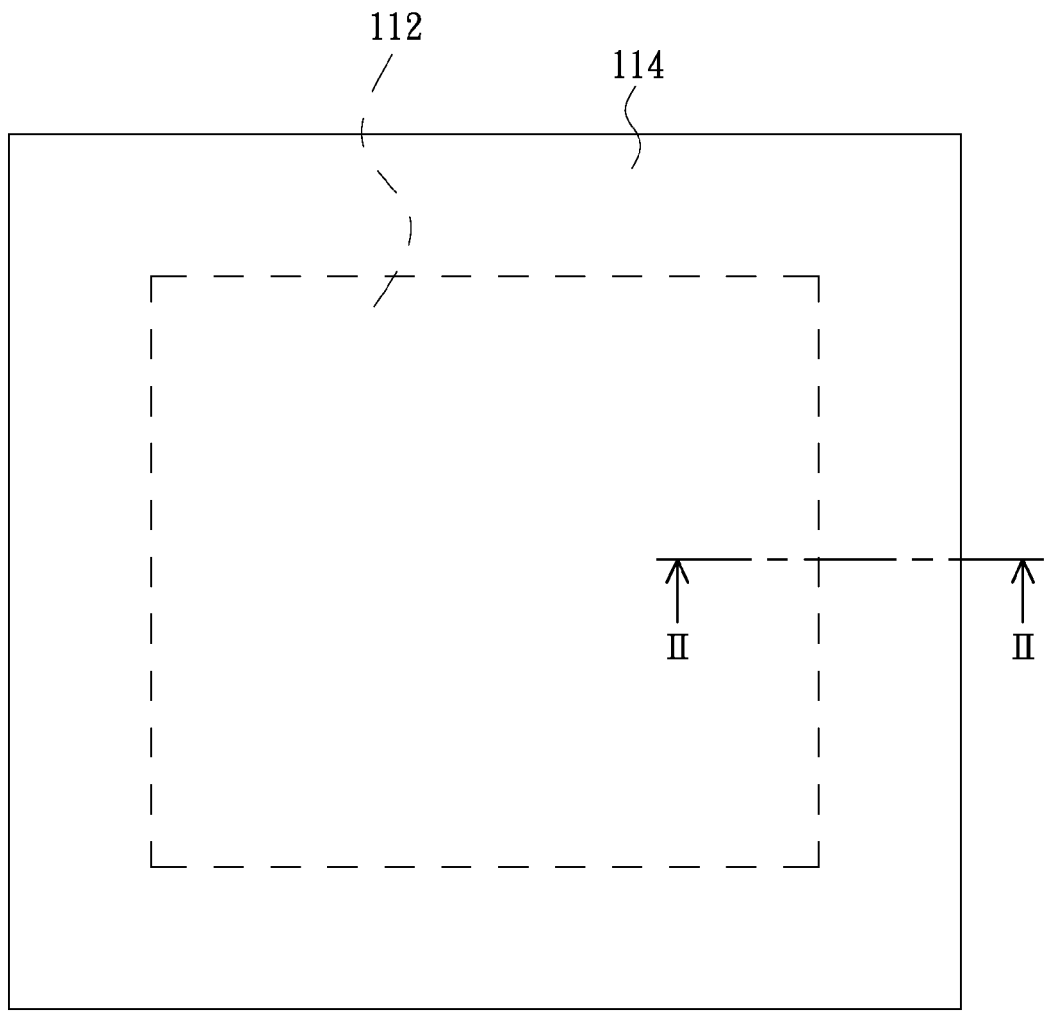
FIG. 2 is a schematic, top view of a substrate of the color electrophoretic display device in accordance with the first embodiment of the present invention.

Referring to FIG. 1A and FIG. 2, FIG. 2 is a schematic, top view of a substrate of the color electrophoretic display device in accordance with the first embodiment of the present invention. FIG. 1A is a schematic, partial, cross-sectional view of the substrate along a line II-II. First, a substrate 110 is provided. The substrate 110 has a displaying region 112 and a peripheral circuit region 114 around the displaying region 112. In the present embodiment, the substrate 110 is a rigid substrate. For example, the rigid substrate can be, but not limited to, a glass substrate or a metal substrate.

Figure 1B:
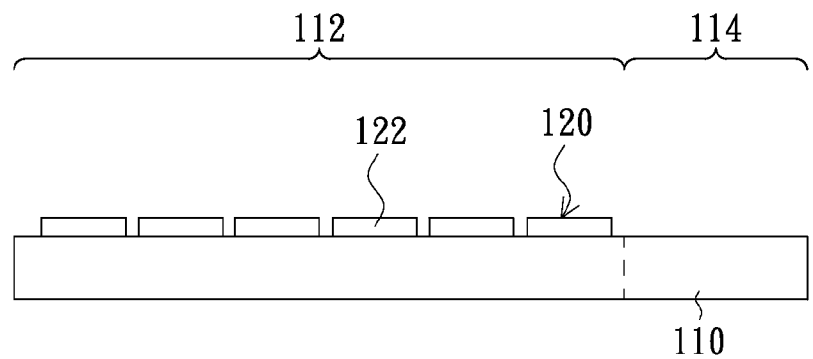

Referring to FIG. 1B, then, a driving array 120 is formed in the displaying region 112 of the substrate 110. In the present embodiment, the driving array 120 includes a number of thin film transistors 122 arranged in an array. The thin film transistors 122 can be, for example, but not limited to, amorphous silicon (a-Si) thin film transistors, poly-silicon thin film transistors, low temperature poly-silicon (LTPS) thin film transistors, organic thin film transistors, or oxide thin film transistors.

Figure 1C:
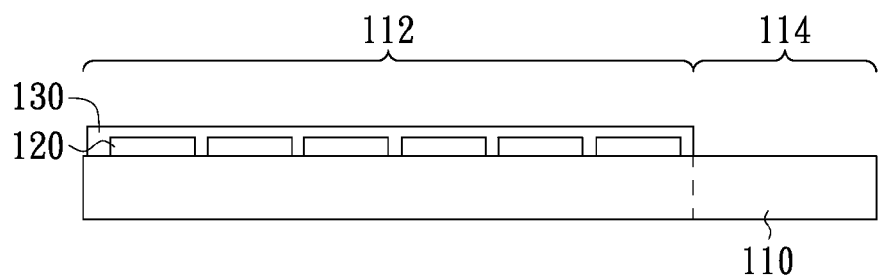

Referring to FIG. 1C, then, an electrophoretic display layer 130 is disposed on the driving array 120. The electrophoretic display layer 130 can be, for example, a microcapsule electrophoretic display layer, a microcup electrophoretic display layer, or a powder electrophoretic display layer. Since the technology about the electrophoretic display layer is well known by one skilled in the art and is not described herein.

Referring to FIG. 1D to FIG. 1I, then, a thermal transfer process is performed so as to form a color filter layer 135 on the electrophoretic display layer 130. In the present embodiment, the thermal transfer process is a laser thermal transfer process. The steps of forming the color filter layer 135 by employing the laser thermal transfer process will be described in detail below. However, the description is not intended to limit the present invention.

Figure 1D:
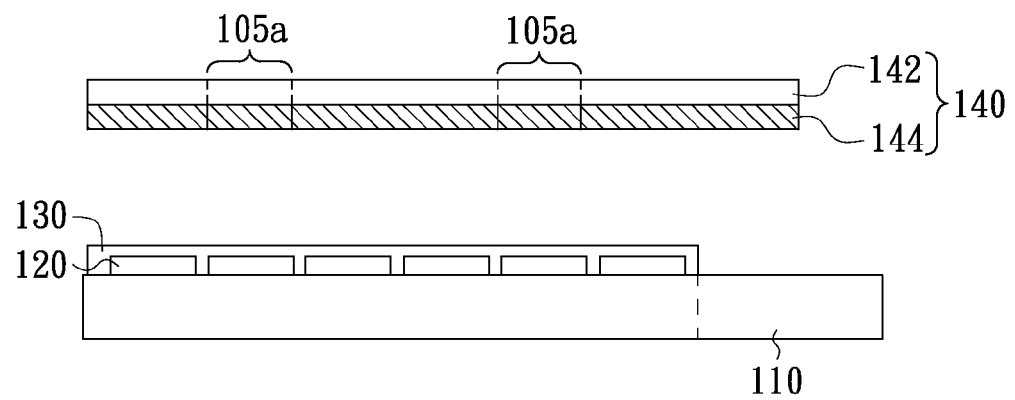

Firstly, referring to FIG. 1D, after disposing the electrophoretic display layer 130 on the driving array 120, a red dye film 140 is provided. The red dye film 140 inlcudes a base film 142 and a red dye layer 144 disposed on the base film 142. In addition, the red dye film 140 has a number of predetermined areas 105a, which are defined by a number of dotted lines as shown in FIG. 1D. The predetermined areas 105a are configured for accepting irradiation of a laser in the subsequent steps. In other words, the predetermined areas 105a respectively correspond to the areas of the electrophoretic display layer 130 where the red color filter pattern is formed.

Subsequently, referring to FIG. 1D, the red dye film 140 is disposed above the electrophoretic display layer 130 so that the red dye layer 140 faces to the electrophoretic display layer 130.

Figure 1E:
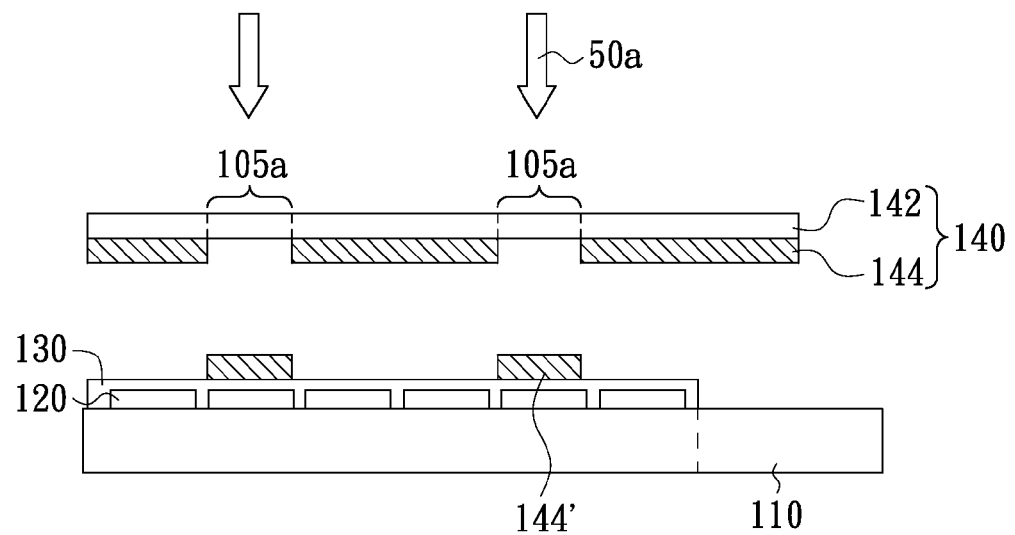
Figure 1F:
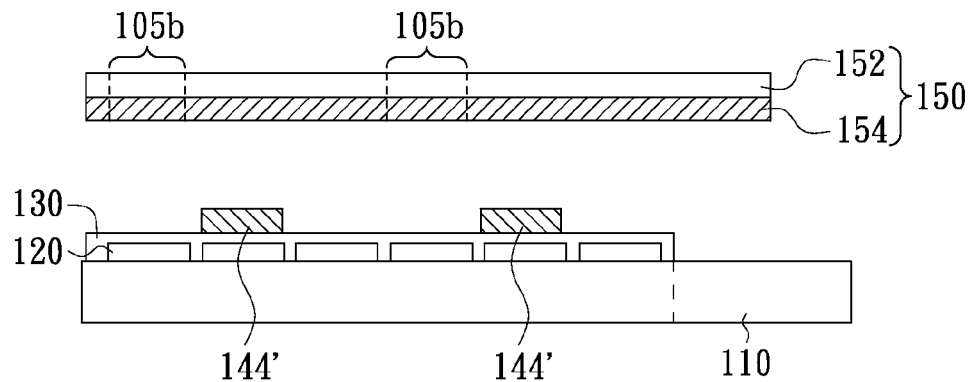
Figure 1G:
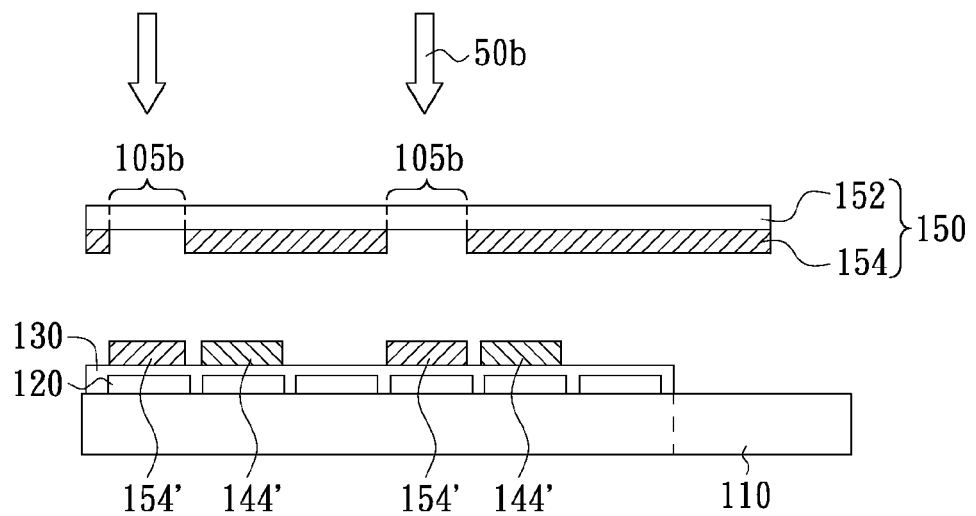
Figure 1H:
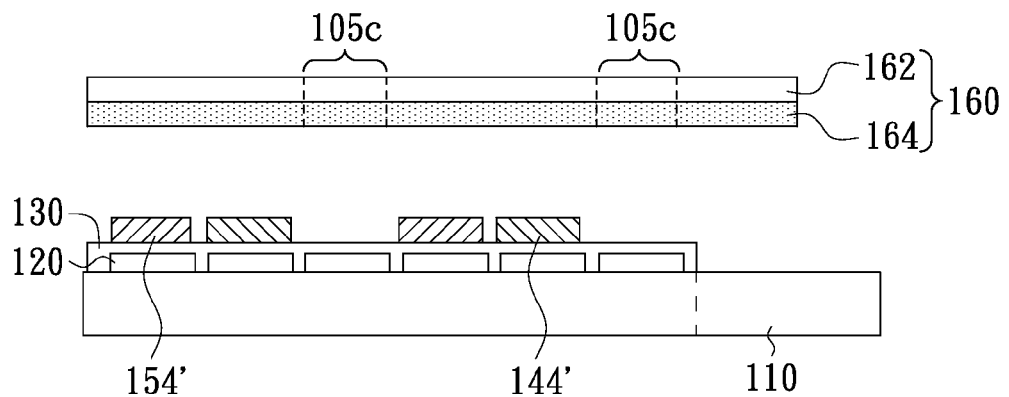
Figure 1I:
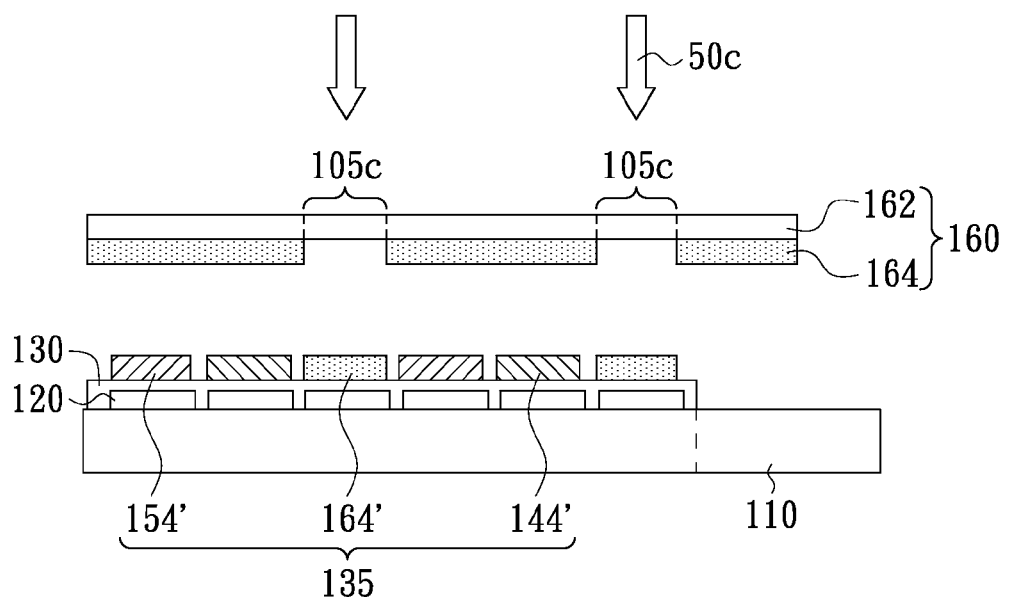

Afterwards, referring to FIG. 1E, a laser 50a irradiates the predetermined areas 105a of the red dye film 140 from a side of the base film 142. Thus, the red dye layer 144 in the predetermined areas 105a is heated. The red dye of the red dye layer 144 in predetermined areas 105a is evaporated to be deposit on the electrophoretic display layer 130. Therefore, the red dye of the red dye layer 144 in the predetermined areas 105a of the red dye film 140 are transferred to the electrophoretic display layer 130. As a result, a number of red color filter patterns 144' corresponding to the predetermined areas 105a of the red dye film 140 are formed on the electrophoretic display layer 130.

Thereafter, referring to FIG. 1F to FIG. 1I, after forming the red color filter patterns 144' on the electrophoretic display layer 130, similarly, a green dye film 150 and a blue dye film 160 are provided in sequence to transfer a number of green color filter patterns 154' and a number of blue color filter patterns 164' by irradiated by laser 50b and laser 50c respectively. As a result, the color filter layer 135 including the red color filter patterns 144', the green color filter patterns 154' and the blue color filter patterns 164' is finished. In detail, the green dye film 150 includes a base film 152 and a green dye layer 154 on the base film 152. The blue dye film 160 includes a base film 162 and a blue dye layer 164 on the base film 162. Additionally, the green dye film 150 has a number of predetermined areas 105b and the blue dye film 160 has a number of predetermined areas 105c. The predetermined areas 105b respectively correspond to the areas of the electrophoretic display layer 130 where the green color filter pattern is formed. The predetermined areas 105c respectively correspond to the areas of the electrophoretic display layer 130 where the blue color filter pattern is formed. The green dye film 150 is irradiated by a laser 50b and the blue dye film 160 is irradiated by a laser 50c, the green color filter patterns 154' and the blue color filter patterns 164' are formed on the electrophoretic display layer 130. As a result, the color filter layer 135 includes the red color filter patterns 144', the green color filter patterns 154' and the blue color filter patterns 164'.

Figure 1J:
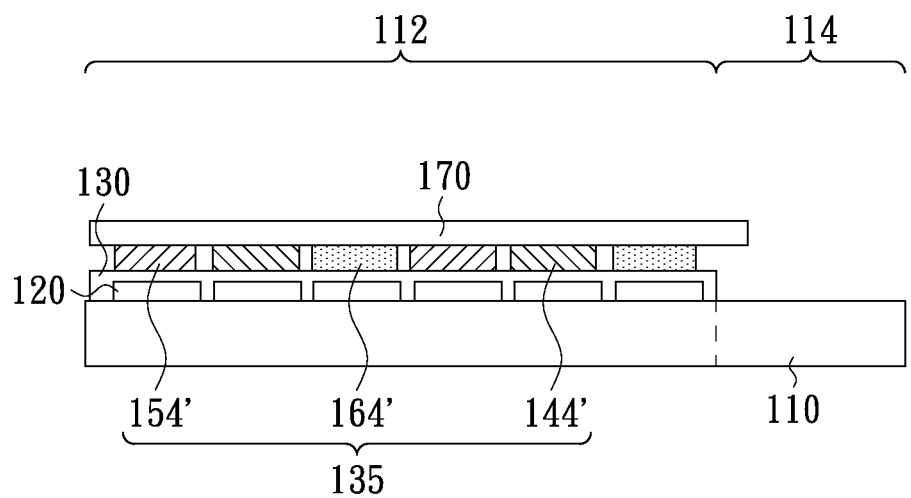
Figure 1K:
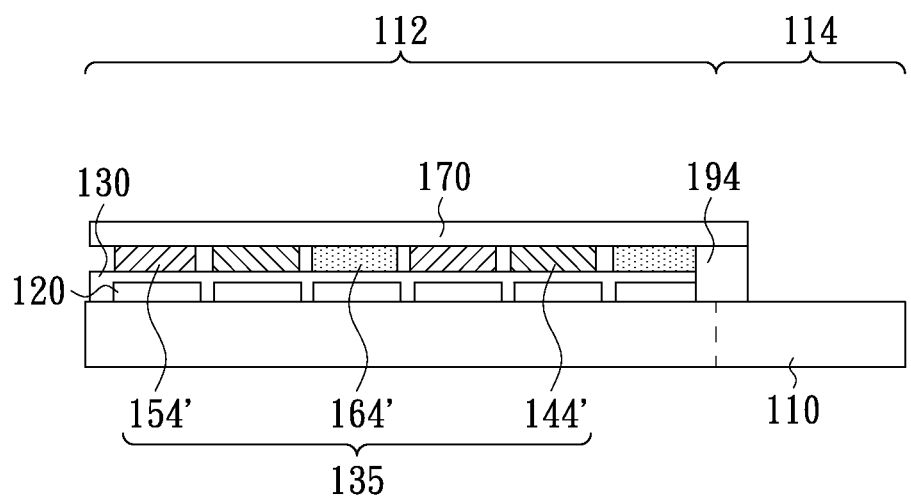

Referring to FIG. 1J to FIG. 1K, after forming the color filter layer 135, a transparent protecting layer 170 can be alternately formed to cover the color filter layer 135. Then, an edge sealant 194 is formed between the transparent protecting layer 170 and the substrate 110. In detail, the edge sealant 194 is located between the edge of the transparent protecting layer 170 and the substrate 110 so as to surround the driving array 120 and the electrophoretic display layer 130. Thus, the edge sealant 194 can configured for preventing external oxygen and moisture entering into the interspace of the transparent protecting layer 170 and the substrate 110 to damage the driving array 120 and the electrophoretic display layer 130. In the present embodiment, a material of the edge sealant 194 can be, but not limited to, a ultraviolet polymerization resin, a thermal polymerization resin, a silicone, or a polyurethane.

Figure 1L:
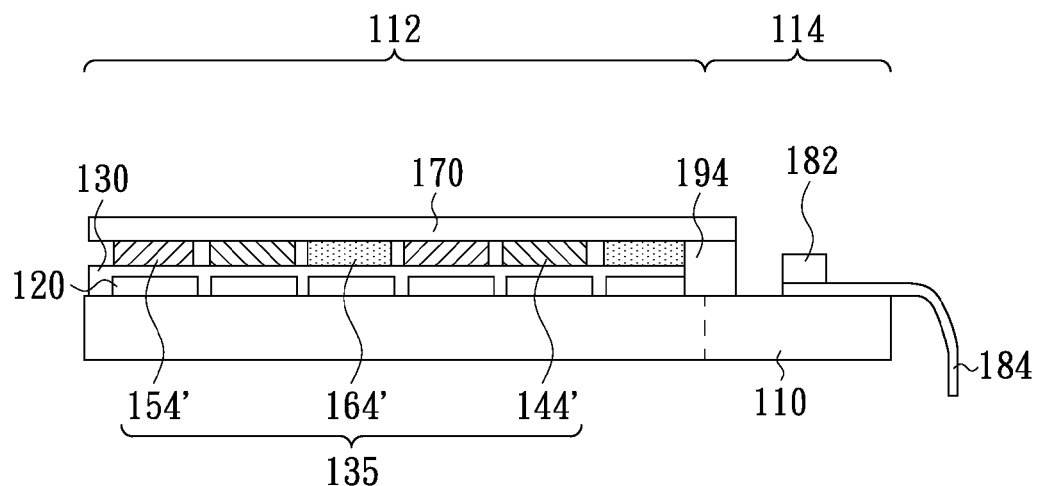

Referring to FIG. 1L, a driving circuit 182 is disposed in the peripheral circuit region 114 of the substrate 110 to electrically connect to the driving array 120. In the present embodiment, the driving circuit 182 is, for example, an integrated circuit (IC) electrically connected to an external control circuit (not shown) through a printed circuit board 184. In the present embodiment, the printed circuit board 184 is, for example, a flexible printed circuit (FPC). A part of the printed circuit board 184 is located in the peripheral circuit region 114 of the substrate 110.

Figure 1M:
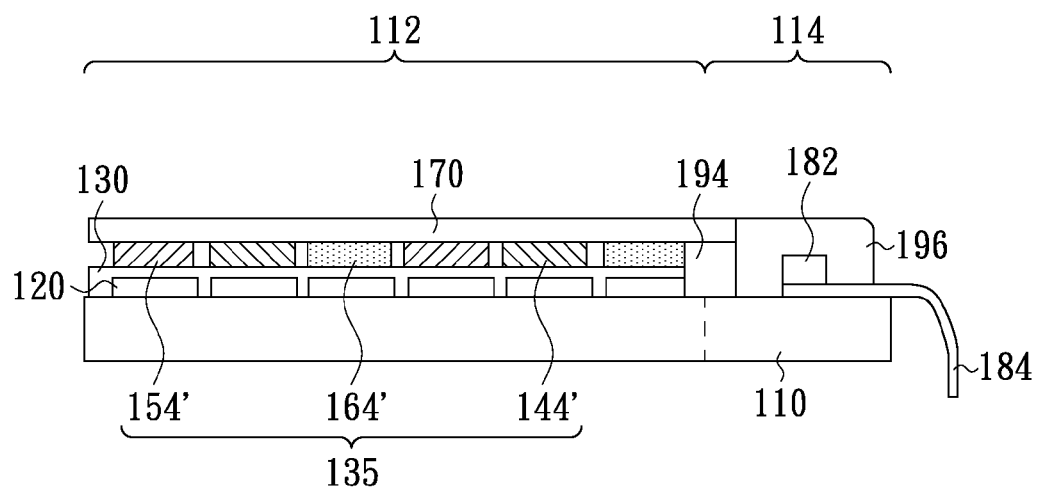

Referring to FIG. 1M, a packaging sealant 196 is formed in the peripheral circuit region 114 of the substrate 110. In detail, the package sealant 196 is disposed on the substrate 110 and around the driving array 120, the electrophoretic display layer 130, the color filter layer 135 and the transparent protecting layer 170. Further, the package sealant 196 covers the driving circuit 182 and a part of the printed circuit board 184 located on the substrate 110.

FIG. 3A to FIG. 3E illustrates schematic, partial, cross-sectional views of a color electrophoretic display device in a process flow in accordance with a second embodiment of the present invention. The method for manufacturing the color electrophoretic display device in the second embodiment is similar to the method for manufacturing the color electrophoretic display device in the first embodiment except the method of providing the substrate.

Figure 3A:
FIG. 3A to FIG. 3E illustrate schematic, partial, cross-sectional views of a color electrophoretic display device during a process flow in accordance with a second embodiment of the present invention.
Figure 3B:
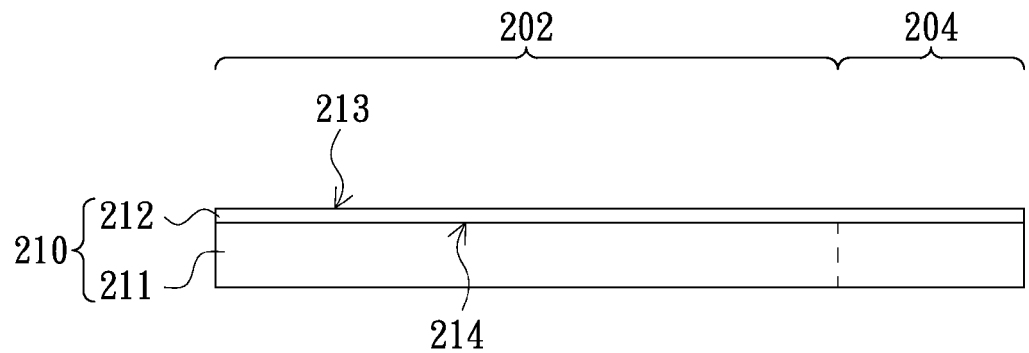

Referring to FIG. 3A to FIG. 3B, in the present embodiment, the method of providing the substrate 210 includes the following steps. At first, a rigid substrate 211 is provided. And then, a flexible substrate 212 is formed on the rigid substrate 211. The flexible substrate 212 includes a front surface 213 and a rear surface 214. The rear surface 214 is attached to the rigid substrate 211. In the subsequent steps, the driving array is formed on the front surface 213 of the substrate 212.

A material of the rigid substrate 211 can be, but not limited to, glass or metal. A material of the flexible substrate 212 can be, but not limited to, plastic, polyimide (PI), polyethylene terephthalate (PET), polyethersulfone (PES), polycarbonate (PC). The flexible substrate 212 can be formed on the rigid substrate 211 using a coating method. The coating method can be, but not limited to, a spin coating method, a screen printing method, an inkjet printing method, or a slit coating method.

Figure 3C:
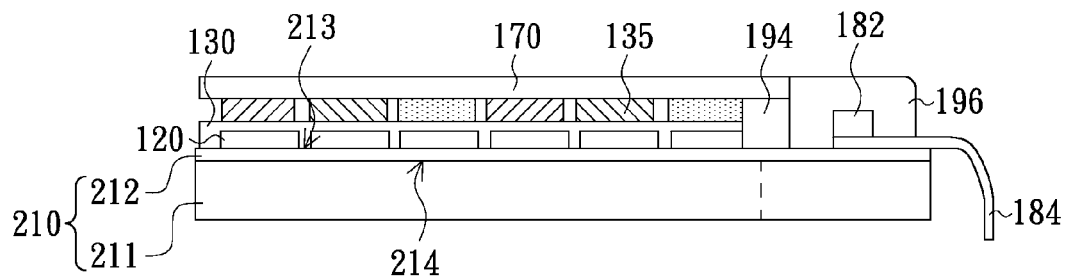

Referring to FIG. 3C, the driving array 120, the electrophoretic display layer 130, the color filter layer 135 and the transparent protecting layer 170 are formed on the displaying region 202 of the substrate 210 one by one. Then, the edge sealant 194, the driving circuit 182 and the printed circuit board 184 and the packaging sealant 196 are formed on the peripheral circuit region 204 of the substrate 210. The processes of forming the above components are similar to the processes in the first embodiment and are not described here.

Figure 3D:
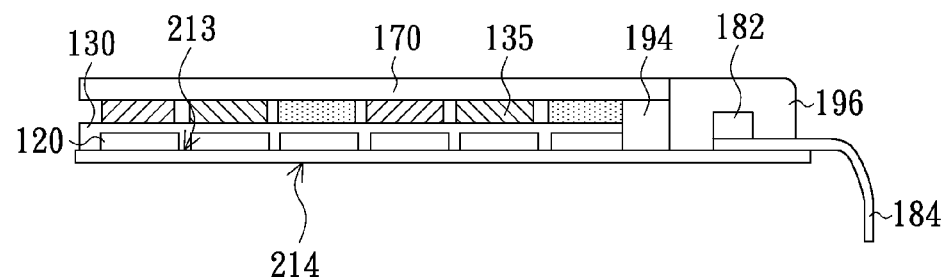

Next, referring to FIG. 3D, the rigid substrate 211 is removed. A method of removing the rigid substrate 211 can be a thermal separating method, a direct separating method or a laser separating method. In the present embodiment, the laser separating method is used to damage an interface between the rigid substrate 211 and the flexible substrate 212, thereby separating the rigid substrate 211 and the flexible substrate 212. A wavelength of the laser is in a range from 300 nanometers to 400 nanometers.

Figure 3E:
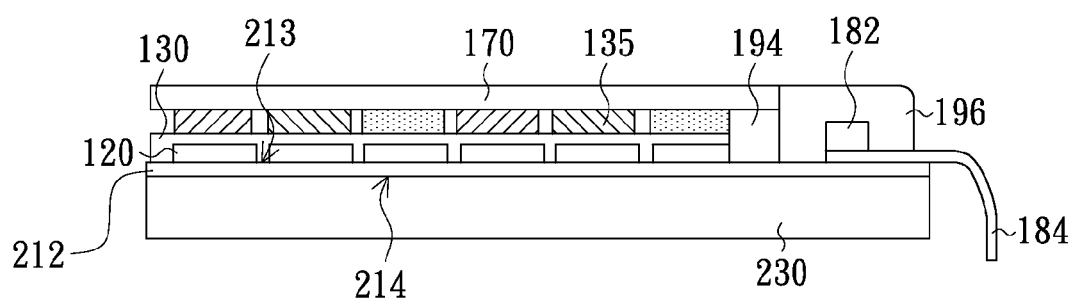

Referring to FIG. 3E, after removing the rigid substrate 211, a backside protecting layer 230 can be formed on the rear surface 214 of the flexible substrate 212. The backside protecting layer 230 can improve the strength of the flexible substrate 212 and prevent the flexible substrate 212 from excess physical damage.

In summary, in the method for manufacturing the color electrophoretic display device of the present invention, the color filter layer is directly formed on the electrophoretic display layer of the electrophoretic display device by using the thermal transfer process. Thus, the problems such as the air bubbles and the interspaces during the process of adhering the traditional color filter without flexibility to the electrophoretic display layer disposed on the glass substrate can be avoided. Meanwhile, the problems such as the difficult alignment and the inexact alignment during the process of adhering the flexible color filter to the electrophoretic display layer can be avoided. Therefore, the method for manufacturing the color electrophoretic display device can be suitable for the traditional rigid display device and the new flexible display device. The method for manufacturing the color electrophoretic display device can increase the production eligibility rate of the color electrophoretic display device and improve the display quality of the color electrophoretic display device.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for manufacturing a color electrophoretic display device, comprising:
   providing a flexible substrate having a displaying region and a peripheral circuit region around the displaying region, the method of providing the flexible substrate comprising:
      providing a rigid substrate: and
      forming the flexible substrate having a front surface and a rear surface the rear surface attached to the rigid substrate, the driving array formed on the front surface;
   forming a driving array in the displaying region of the flexible substrate;
   disposing an electrophoretic display layer directly on the driving array;
   performing a thermal transfer process resulting in a color filter layer formed by at least one color filter pattern aligned with the driving array being formed on the electrophoretic display layer:

forming a transparent protecting layer to cover filter layer;
disposing a driving circuit out of the displaying region and in the peripheral circuit region of the flexible substrate to electrically connect to the driving array; and
removing rigid substrate.

2. The method for manufacturing the color electrophoretic display device as claimed in claim 1, further comprising:
   forming a transparent protecting layer to cover the color filter layer; and
   disposing a driving circuit out of the displaying region and in the peripheral circuit region of the flexible substrate to electrically connect to the driving array.

3. The method for manufacturing the color electrophoretic display device as claimed in claim 2, further comprising the step of forming an edge sealant between the transparent protecting layer and the flexible substrate to surround the driving array and the electrophoretic display layer.

4. The method for manufacturing the color electrophoretic display device as claimed in claim 2, further comprising the step of forming a packaging sealant in the peripheral circuit region of the flexible substrate to cover the driving circuit.

5. The method for manufacturing the color electrophoretic display device as claimed in claim 1, wherein a method of removing the rigid substrate comprises a thermal separating method, a direct separating method and a laser separating method.

6. The method for manufacturing the color electrophoretic display device as claimed in claim 1, further comprising the step of forming a backside protecting layer on the rear surface of the flexible substrate after removing the rigid substrate.

7. The method for manufacturing the color electrophoretic display device as claimed in claim 1, wherein the thermal transfer process is a laser thermal transfer process, the laser thermal transfer process comprises:
   providing a dye film comprising a base film and a dye layer disposed on the base film;
   disposing the dye film above the electrophoretic display layer so that the dye layer faces to the electrophoretic display layer; and
   applying a laser to heat a plurality of predetermined areas of the dye film so that the dye layer in the predetermined areas being evaporated to transfer to the electrophoretic display layer.

* * * * *